United States Patent
Kunert

[11] 3,735,506
[45] May 29, 1973

[54] TEACHING AND TESTING DEVICE

[76] Inventor: Heinz Kunert, Belvederestrasse 155, 5 Koln-Mungersdorf 41, Germany

[22] Filed: Apr. 16, 1971

[21] Appl. No.: 134,749

[52] U.S. Cl. ..................................................... 35/9 F
[51] Int. Cl. ............................................... G09b 3/08
[58] Field of Search ................................. 35/9 E, 9 F

[56] References Cited
UNITED STATES PATENTS

| | | | |
|---|---|---|---|
| 3,174,231 | 3/1965 | Schure | 35/9 E X |
| 3,105,307 | 10/1963 | Cornell | 35/9 F |
| 3,462,853 | 8/1969 | Kunert | 35/9 F |
| 3,046,675 | 7/1962 | Schure | 35/9 F |
| 3,144,720 | 8/1964 | Kehl | 35/9 F |

Primary Examiner—Wm. H. Grieb
Attorney—Schellin and Hoffman

[57] ABSTRACT

A teaching and testing device wherein the taught material is printed on an elongated strip of material, such as paper which is wound into a cassette. The printed matter is made available in stepwise increments from the cassette through a display sleeve from whence the knowledge is imparted. The sleeve has areas for marking answers to posed questions said areas may be marked with a perforation instrument affixed integrally to said sleeve.

2 Claims, 12 Drawing Figures

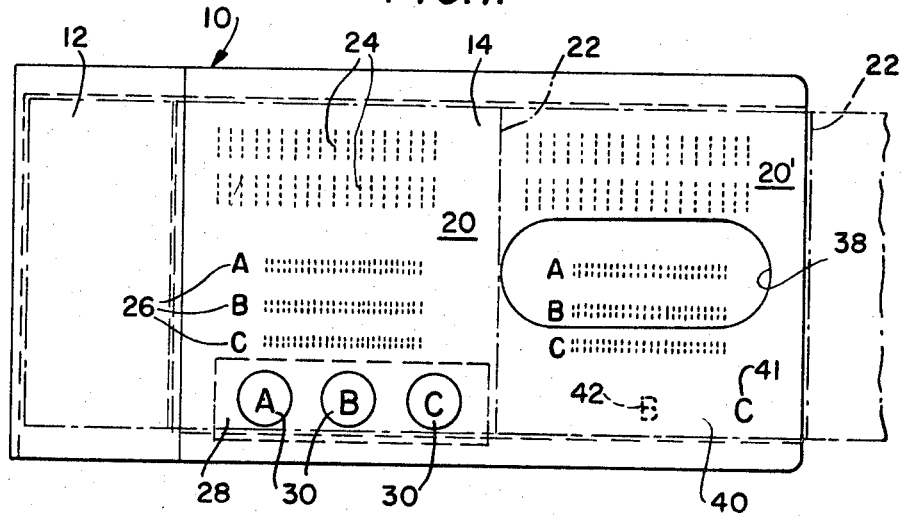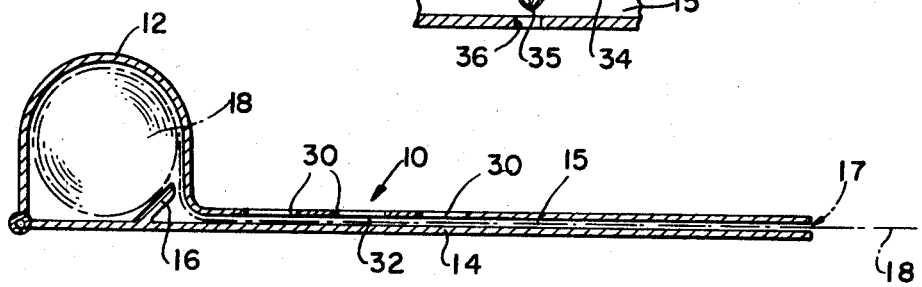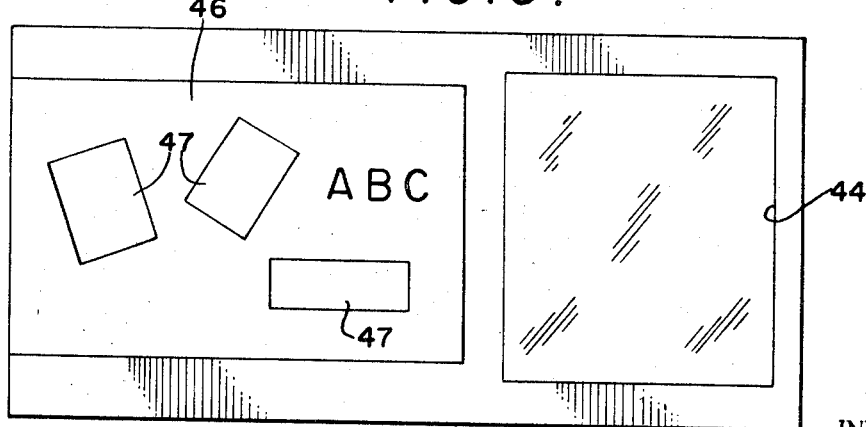

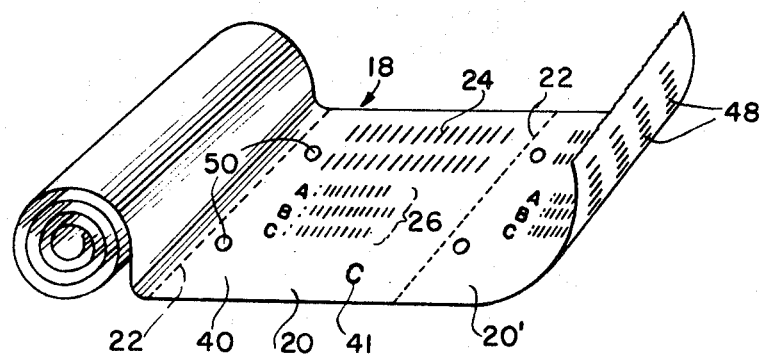
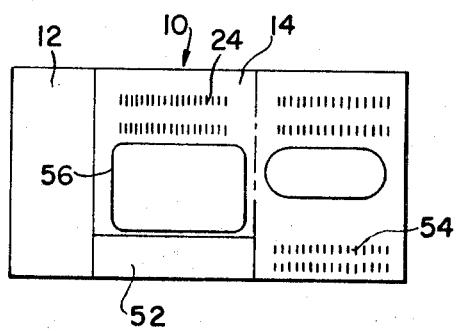
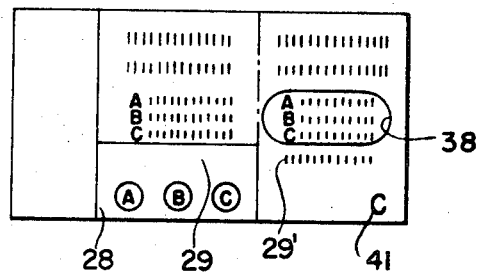
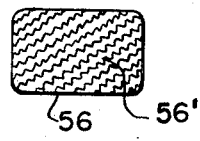
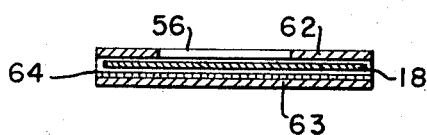
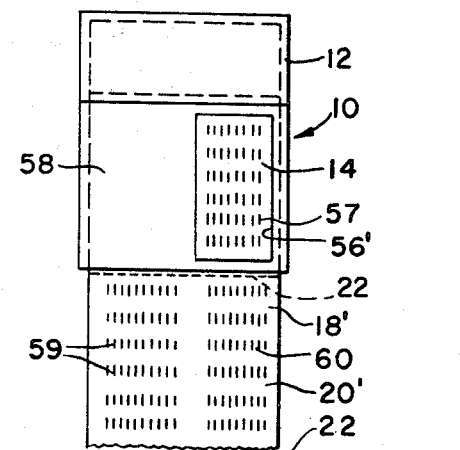

INVENTOR
HEINZ KUNERT

BY *Schellin & Hoffman*
ATTORNEYS

TEACHING AND TESTING DEVICE

BACKGROUND OF THE INVENTION

Programmed teaching has been applied in the educational field in an ever increasing manner, providing a way in which material can be presented in an intensified form of carefully worked out tests and problem-answer sets. Teaching this way also significantly improves the user's retention of the material presented while requiring less time for grasping the teaching matter. For the success of programmed teaching a variety of factors are essential which are known to persons skilled in the art and therefore do not need to be discussed here. The new concept of programmed teaching not only applies to actual institutional teaching, but also to the area of imparting professional and vocational skills; ascertaining a person's suitability for certain tasks; determining his skill or knowledge of a given subject; and may also extend into the field of advertising by way of contests and the like. Furthermore, it is important that programmed teaching affords an excellent means of acquiring knowledge or skills in an animated way, as for instance through quizzes, test games, and the like.

Devices for applying printed programs are known. However, these mostly consist of large, bulky units with complicated advancing mechanism for the programs, motors, and intricate printing systems for registering answers. Existing devices are consequently very expensive and have to be stationary, so that the user can only work with them at the institution of learning by which the program is being administered or supervised and cannot do homework in this manner or effectively use it as a student of a correspondence school or for being tested away from the teaching facility. There are known to me also less expensive devices for programmed teaching, which, for instance, are comprised of a kind of duplicating sets. Another device which comes to mind has a windowed cassette containing a stack of individual sheets and a printing unit. As the user manipulates the set, the sheets are extracted from the cassette one by one. Devices of this type lend themselves, above all, for use in specialized schools and in correspondence course programs.

It is an object of the invention to create a device for application with study or problem-answer type programs which can be employed both universally for educational teaching programs, as for training, testing, contests, quizzes and the like, and also most importantly, is of a compact size which permits the user to carry it in a brief case or even in his suit pocket, allowing him to use the device at his convenience in any location. This would mean that it could be utilized while riding busses, trains, airplanes and the like, or while sitting in waiting rooms, etc. Despite the versatility of my novel device, the latter is so simple in its construction, and therefore so inexpensive to manufacture, that according to one feature of my invention, it is suitable for single use of one program tape after which it can be discarded, and according to another feature thereof, any desired number of programs can be administered successively.

SUMMARY OF THE INVENTION

In the novel device, the object of the invention is achieved by means of a cassette having a compartment receiving the program tape roll, and adjacent thereto providing a flat sleeve with a blocking device between the chamber (compartment) and the sleeve. Furthermore the sleeve has strategically placed windows or cutouts on the front side of the sleeve for the display of the problem or question while concealing the answer field, and on the reverse side a window or cutout placed so that instructions can be displayed to the user. The program tape is longitudinally subdivided into a series of work fields, each field containing a complete question or problem, with multiple choice answers, and an answer field recording the user's solution.

When using the device in the manner of the invention, the tape roll is fed from the chamber along the tape channel until the exposed work field is displayed to the user who enters his answer into the answer field. Upon entering his answer, the user manipulates the device which then advances until the next field is displayed. At this time, the associated correct answer to the previously completed problem is displayed allowing the user (and tester) to check the accuracy of his reply. (The blocking device mentioned above prevents the tape roll from being reinserted into the chamber, thereby preventing the user from tampering with his reply once he becomes aware of the correct answer.) Now the second work field can be worked on and the cycle starts again.

According to one embodiment of the invention, it is provided that the sleeve is the same length as the work field of the program tape. In this way the device can be kept desirably compact.

Another embodiment of the invention provides that the sleeve is twice as long as a working field of the program tape and that the second half of the program tape in its forward movement becomes visible at front and back side. Either form of the invention provides that the reverse side of the program tape work fields can be imprinted with additional information, explanatory comments, and the like.

The invention further advantageously provides for advancing the program tape by inserting a finger, pencil or similar object into an oval opening of the sleeve and pulling the program tape forward.

Another embodiment of the novel invention provides that the cassette be disposable for one time use, in which case the cassette may be constructed from an especially inexpensive material.

A still further embodiment of the invention provides that the cassette be made of durable material, i.e., plastic, and that the program compartment and sleeve be provided with an opening for inserting a program tape roll.

Another embodiment of the invention provides that the preprinted correct answer and the answer field of the program tape, where the user's solution will be recorded, be in the same location on the program tape, i.e., they should be superimposed, so that after the program tape is advanced, exposing the user's answer, the preprinted answer will also be visible.

Another feature of the invention provides that the reply field and the problem field of the program tape be partially overlapping and that the reply field be located under a cutout in the sleeve, thereby allowing the user to write his chosen solution directly onto the tape.

According to a preferred embodiment of the invention relating to programs with multiple choice answers, it is provided that the reply field of the sleeve consists of a cutting or embossing device for cutting or embossing of a multiple choice answer on or into the tape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a top plan view of an embodiment of the novel device for program tapes with multiple choice answers.

FIG. 2 is a sectional side view through the device according to FIG. 1.

FIG. 2a is a detail view in enlarged scale showing a variation to FIG. 2.

FIG. 3 is a back view of the features shown in FIGS. 1 and 2.

FIG. 4 is a perspective view of the program tape according to FIGS. 1, 2 and 3.

FIG. 5 is a smaller top plan view of another embodiment of the novel device.

FIG. 6 is another variation of the view shown in FIG. 5.

FIG. 6a is a further fragmentary variation of the view of FIG. 6.

FIG. 6b is a sectional view of a further variation.

FIG. 7 is a plan view of a further variation of the device shown in FIGS. 5 and 6.

DETAILED DESCRIPTION OF THE ILLUSTRATED EMBODIMENTS OF THE INVENTION

Figure 8:
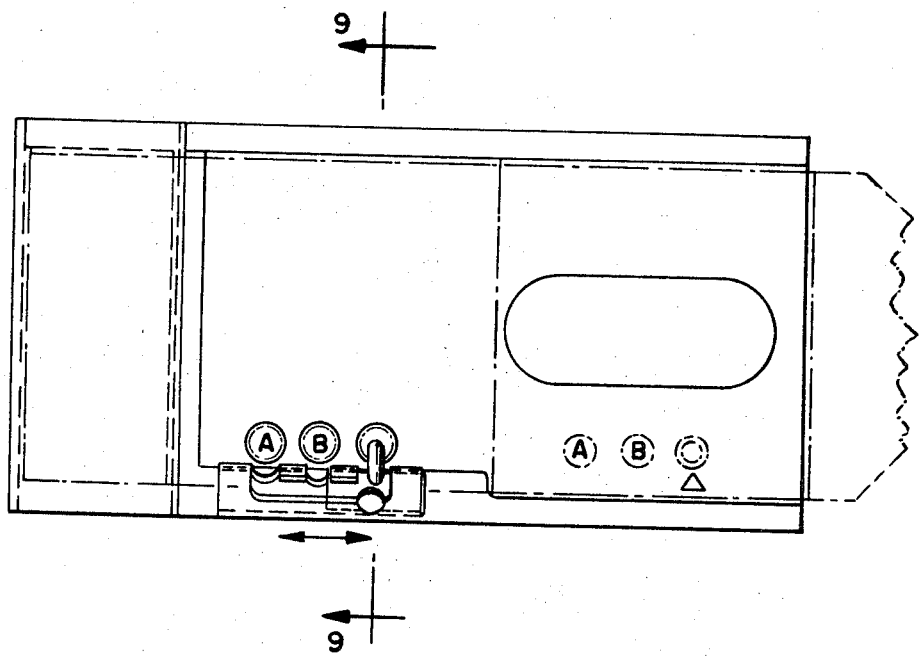
FIG. 8 is a top plan view of another embodiment.

According to the examples in FIGS. 1 to 4, the novel device is intended for use with multiple-answer programs. The device consists of a cassette, generally referred to with numeral 10, which has a chamber 12 for receiving program tape roll 18. One piece with chamber 12, there is a sleeve 14 between whose top and bottom wall there is provided a channel 15 for program tape 18. At the connecting point between the chamber 12 and the sleeve 14, there is provided a blocking device 16, which according to the view in FIG. 2 could, for example, consist of a transversely aligned hook or tongue that is formed in such a way that if an attempt is made to push back the program tape 18 in FIG. 2 to the left through the channel 15 into the chamber 12, this will be prevented by program tape 18 pushing itself under the hook or tongue at the connecting point between chamber 12 and channel 15. This blocking device 16 is designed to make the novel device "tamper-proof" which will be explained in greater detail later.

We will now discuss FIG. 4 which illustrates a program tape roll 18 that may be used in the device as shown in FIGS. 1 to 3. The program tape 18 consists of a series of work fields 20, 20', etc., whereby between work fields 20 and 20' there may be arranged perforation lines 22 to allow the work fields 20, 20' to be separated after use to facilitate filing. Next to each perforation line 22 there may be a punch out opening 50 to allow the individual sheets to be filed in standard folders. In stead of the perforation line 22 one could easily provide a cutting edge at the exit opening 17 (FIG. 2) of sleeve 14. This, however, would be less advantageous since the cutting edge might damage the pocket lining when carried in a jacket pocket.

On each of the work fields 20, 20' there is an imprint 24 as shown in FIGS. 1, 4, 5 and 6, representing a basis information of the teaching program containing a problem, a question or the like. Below imprint 24 there are printed three multiple choice answers 26, designated A, B and C. Finally below the three multiple choice answers near the lower edge of the program tape at 41, that letter is printed which corresponds to the correct multiple choice answer. In the instant example, this part of the program tape and the reply field 40 are the same into which the user enters the answer selected by him.

Returning to FIGS. 1 to 3, in this example, sleeve 14 of cassette 10 is the same length as two work fields 20, 20' of tape 18. The example designates the work field of program tape 18 adjacent to chamber 12 as 20, and the next following field as 20'. The top side of the sleeve 14 is transparent within the area of work field 20 except for the answer field 28 which is marked with a dotted line in FIG. 1, so that one can read imprints 24 and 26 through the sleeve.

Figure 9:
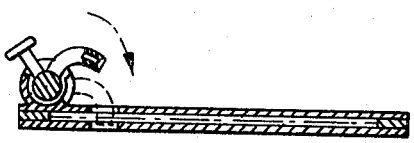
FIG. 9 is a sectional view taken along line 9—9 of FIG. 8.

In answer field 28 the top side of sleeve 14 has three round holes 30. A colored or shaded ribbon 32 runs under the holes 30. Instead of the three round holes 30, there can be provided push buttons which have a printing type corresponding to letters A, B and C on their underside as exemplified in FIGS. 8 and 9 to be discussed later. The user selects the answer that seems correct to him from the multiple choice answers 26 and enters it through holes 30 or by depressing a push button into field 40. It is evident that instead of the color ribbon 32 a two-component printing ink of a known kind can be used. In this arrangement one of the components could be contained in a carrier corresponding to the color ribbon 32, whereas the other component would be impregnated within field 40 of program tape 18, so that when pressure is exerted through the holes or buttons A, B, C, a corresponding imprint results in field 40.

FIG. 2a shows another variation providing below holes 30' a cutting or embossing body 34 with printing pins 35 instead of the color ribbon 32. Opposite these printing pins in the lower wall of the sleeve 14 there is an indentation or hole 36. If one presses through hole 30' onto embossing body 34, pin 35 marks the program tape 18 accordingly in the area of field 40.

An example of such cut or embossed marking is shown at numeral 42 in FIG. 1.

One will further recognize that in the top wall of sleeve 14, within the area of work field 20', there is provided an oval opening 38 through which program tape 18 in FIG. 1 and 2 can be moved from left to right with the finger. Instead of the wide finger opening 38, there can, of course, be provided a small slot-like opening through which the tape can be moved with a pencil or other pointed object.

After the user has entered the multiple-choice answer selected by him into field 40 in the manner described above, he pushes the program tape 18 to the next work field. Within the area of work field 20' of FIG. 1, the surface of sleeve 14 is transparent in its entirety. The user, therefore, can now see imprint 41, previously concealed, indicating the correct multiple-choice answer. In the example of FIG. 1, the user at 42 marked the wrong choice "B," whereas the correct answer should have been "C" as shown in 41.

Sleeve 14 on its underside, within the area of chamber 12, and within the area of the work field marked 20 in FIG. 1 at 46, is not transparent, but advantageously opaque, and may be covered with advertising or imprints 47. Sleeve 14 within area 44 on the reverse side of the work field marked 20' in FIG. 1, is transparent, so that further information 48 (FIG. 4) can be imprinted on the back of program tape 18, which information may relate to the next question and can be read in area 44 on the back side of cassette 10.

The example of FIG. 5 is different from the preceding example in that the concealed reply field 28 is widened at 29, allowing the program tape 18 under widening 29 to show additional explanation or information 29', with the answer. Only after the user has given his answer, and the tape has been moved accordingly through sleeve 14, will he be able to read this additional information or explanation 29'.

The tamperproof device mentioned previously, forces the user to enter or mark his answer before he can check the correct solution 41 by advancing the program tape 18. To prevent tampering, there is provided blocking device 16 which precludes the tape from being reinserted into chamber 12; moreover, entry devices 30, 32, 34, 35 are arranged in such a way that the entry or marking of the reply is only possible as long as the associated work field of tape 18 is in the position marked 20 in FIG. 1. A subsequent entry should not be possible, and if made, should be readily discernable. To achieve this end, the following could be used for example: the above described two-component printing ink, a specially prepared ribbon 32 with unusual markings or colors, or a corresponding special printing pin 35 whose pattern cannot be imitated.

The example of FIG. 6 shows cassette 10 in the left part of sleeve 14 as having an enclosed part 52, and above it, an open window 56 through which the user can write his reply to question 24 directly onto the tape. After advancing the program tape 18 to the next work field, the user can read the imprinted correct solution at 54 and at once determine whether the solution he inserted through window 56 was correct.

The embodiment shown in FIG. 6a shows the plate 56' that is hatched or knurled installed in the sleeve 14 under window 56. When one writes onto the program tape 18 through window 56, the impression will be distorted by the hatched or knurled plate 56' below so that one can see immediately whether the answer was entered while program tape 18 was in cassette 10, since an entry made on any other surface would not have the same appearance.

According to the embodiment in FIG. 6b, carbon paper 64 may be installed with the carbon side facing up over lower plate 63 so that impressions made on the program tape 18 through window 56 would leave a mark on the reverse side of program tape 18. View or position 64 also could utilize the two-component printing ink described earlier, whereby one component is stored in position 64, and the other component is impregnated into the program tape 18. Therefore, if an impression is made in window 56 on program tape 18, the two-component printing ink will cause the impression to appear on the program tape 18.

These variations, which also can be applied to the example shown in FIG. 7, essentially serve to make the device tamperproof.

FIG. 7 shows two further variation possibilities. On one hand, it actually is sufficient if sleeve 14 is the length of one work field (20 or 20' in FIG. 1) so that the program tape 18' after completion (according to FIG. 7 by handwritten entry of the reply in the area of open window 56') immediately exits from sleeve 14. The novel device thus attains a shorter length and is even more easily carried in the pocket. The second variation shown in FIG. 7 consists in program tape 18' being imprinted in such a way that the printing lines run transversely to the longitudinal axis of the tape.

In the example of FIG. 7 the surface of sleeve 14 is opaque at 58, whereas on tape 18' within the area of window 56', a problem text is printed with an open space 57 which is to be written in by the user. The correct answer, sometimes with additional information, is printed onto program 18' at 59, and the user can compare his recorded answer 60 for correctness after he advances tape 18'.

In order to provide yet another marking means a mechanical punching element is permanently affixed to the top of sleeve 14. A single pivoted punch means is slidable in a holding means so that it may be moved to be in juxtaposition with any of the three identified answers. As in FIG. 9 the punch is moved through an arc to permanently punch through the opening in the top of sleeve 14, through the paper 20 and through an aligned hole in the bottom of sleeve 14 as in connection with the embodiment shown in FIG. 2a.

It can easily be seen that the novel invention, in spite of its simplicity, has the capacity of a teaching machine, i.e., enables adherance to a predetermined program sequence, is tamperproof, and utilizes the game-playing instinct in the teaching process.

The invention was described above by example of the conventional teaching programs as they are applied in the institutional area. It will be obvious to the expert that the novel device may be used also for test programs, contests, quizzes, games and the like.

While the novel invention has been illustrated and described as embodied in the examples, it is not intended to be limited to the details shown, since various modifications and structural changes may be made without departing in any way from the spirit of the present invention.

What is claimed is:

1. A teaching and testing device comprising a cassette with a chamber for receiving a roll of program tape longitudinally divided into a plurality of work fields with problem and answer displaying fields; a flat sleeve at least the length of one work field connected with said chamber for the passage of said tape, said sleeve having at least one transparent section for displaying a problem, at least one opaque section for concealing the correct answer to the problem, answer recording means comprising a pivoted embossing punch slidably mounted on said sleeve for indicating a choice of a plurality of answers, and means for advancing said tape, and an angularly disposed rigid tape blocking member within said chamber adjacent the entry to said sleeve and extending at least across said entry to a point apart from the line of travel of said tape.

2. A teaching and testing device comprising a cassette with a chamber for receiving a roll of program tape longitudinally divided into a plurality of work fields with problem and answer displaying fields; a flat sleeve at least the length of one work field connected with said chamber for the passage of said tape, said sleeve having at least one transparent section for displaying a problem, said transparent section at least partially overlapping said answer field, at least one opaque section for concealing the correct answer to the problem, an answer recording part including a window in the front part of said sleeve; a knurled plate under said window for producing a distinctive distorted mark, and means for advancing said tape, and an angularly disposed rigid tape blocking member within said chamber adjacent the entry to said sleeve and extending at least across said entry to a point apart from the line of travel of said tape.

* * * * *